United States Patent [19]

Rhoads et al.

[11] Patent Number: 4,594,649
[45] Date of Patent: Jun. 10, 1986

[54] BOOTSTRAP DRIVE FOR A TWO-TRANSISTOR FORWARD CONVERTER

[75] Inventors: Paul M. Rhoads, Orlando; Arthur H. Renkes, Longwood, both of Fla.

[73] Assignee: NCR Corporation, Dayton, Ohio

[21] Appl. No.: 707,289

[22] Filed: Mar. 1, 1985

[51] Int. Cl.[4] .................... H02H 7/122; H02M 7/537
[52] U.S. Cl. ........................................ 363/56; 363/21; 363/131
[58] Field of Search .................... 363/20–21, 363/56, 95, 97, 131

[56] References Cited

U.S. PATENT DOCUMENTS

| | | | |
|---|---|---|---|
| 3,697,852 | 10/1972 | Gerbitz | 363/21 |
| 3,946,301 | 3/1976 | Love | 363/56 |
| 4,318,168 | 3/1982 | Faxon | 363/21 X |

Primary Examiner—Peter S. Wong
Attorney, Agent, or Firm—Wilbert Hawk, Jr.; Floyd A. Gonzalez; Edward Dugas

[57] ABSTRACT

A DC to DC voltage converter of the type having one switching transistor on the top side of the transformer and a second switching transistor on the bottom side. Opposite ends of the transformer are diode clamped to the bottom rail reference voltage. A bootstrap winding configuration taken from the top of the transformer drives the top switching transistor to eliminate the need for a tertiary winding. A pulse width modulated circuit drives the bottom transistor.

7 Claims, 1 Drawing Figure

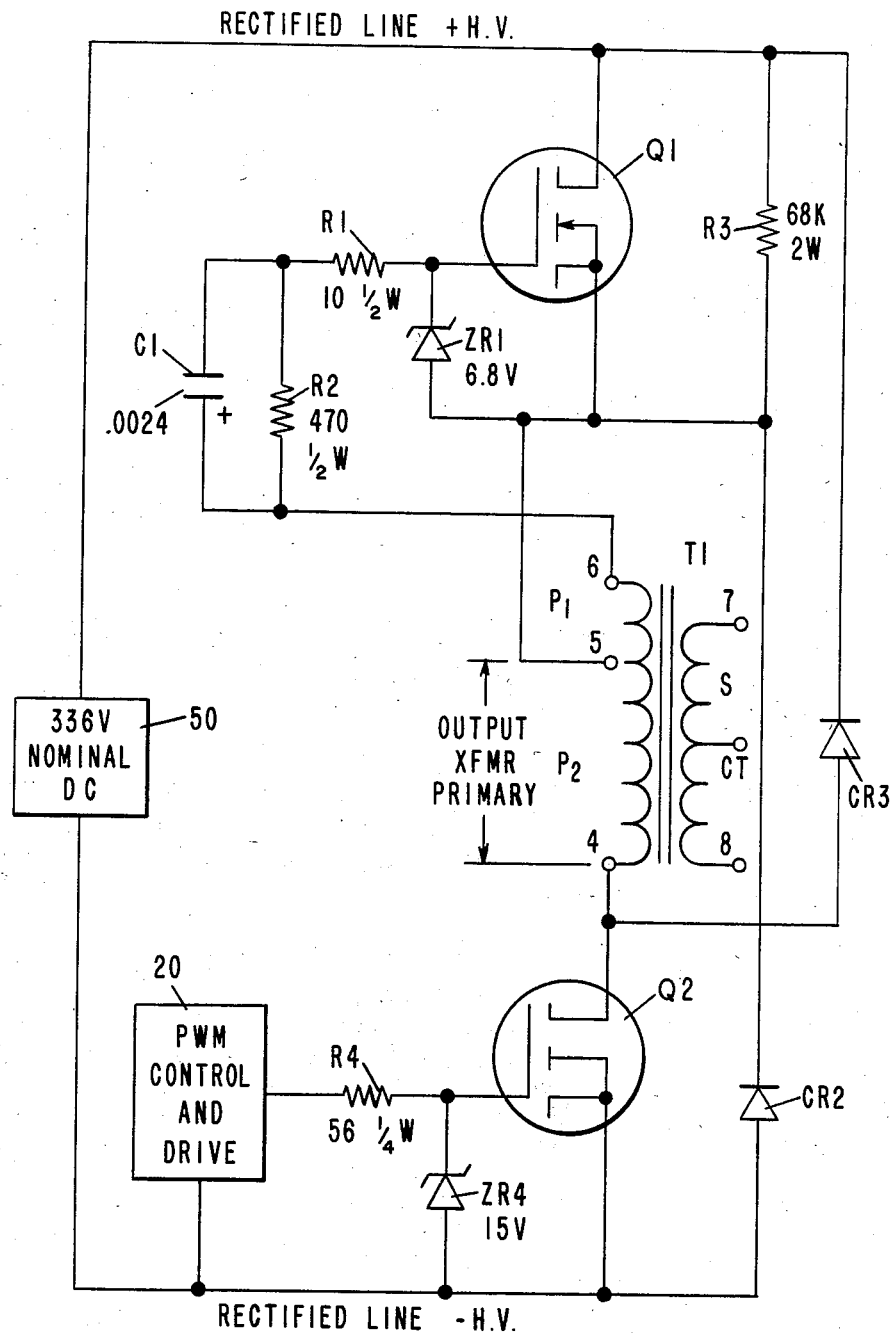

BOOTSTRAP DRIVE FOR A TWO-TRANSISTOR FORWARD CONVERTER

BACKGROUND OF THE INVENTION

In the art of DC to DC converters, one of the most common topologies is a tertiary winding in the primary of the converter transformer which winding allows the core to reset by clamping it back to the primary voltage. A difficulty associated with that form of operation is that the tertiary voltage must rise considerably above the positive rail voltage which means that a transistor having a higher voltage breakdown, approximately twice the voltage that would normally be used, is required for turning the rail voltage off. A topology known as a two transistor forward converter where a transistor is positioned on the top side of the transformer and another is positioned on the bottom side of the transformer and in operation you turn both transistors on and off simultaneously and provide a diode clamp for opposite ends of the transformer to the top and bottom rails is known in the prior art. With that topology, the top transistor has to be driven with a separate drive transformer. The present invention is directed to a configuration which eliminates the need for the drive transformer.

SUMMARY OF THE INVENTION

According to the present invention, there is provided a transformer having a primary winding and at least one secondary winding, the primary winding being divided into a first and a second primary section. A first and second electronic switch are connected to opposite ends of the second primary section and across a source of direct voltage which is to be converted. A switch control means is connected to one of the electronic switches for causing the switch to open and close periodically. The first primary winding section is operatively connected to the other electronic switch to control its operation by means of a storage device and a voltage regulating device. Diode clamping means are used to clamp opposite ends of the second primary section of the transformer to the direct voltage source. The secondary winding of the transformer is adapted to be connected to a rectified load.

The converter according to the present invention is distinguished by the fact that the first primary winding section eliminates the need for a drive transformer and secondarily, the need for a high voltage type switching transistor.

It is therefore an object of the present invention to provide an improved two transistor forward converter.

It is another object of the present invention to provide a converter of the two transistor type which requires no separate drive transformer.

These and other objects of the present invention will become more apparent when taken in conjunction with the following description and drawing, wherein like characters indicate like parts and which drawing forms a part of the present application.

BRIEF DESCRIPTION OF THE DRAWING

The drawing is to a schematic circuit diagram of the preferred embodiment of a converter according to the present invention.

DESCRIPTION OF THE PREFERRED EMBODIMENT

Referring to the drawing, the transformer T1 is comprised of a primary winding having a bootstrap section $P_1$ extending between terminals 5 and 6 and a main primary winding section $P_2$ extending between terminals 4 and 5. Terminal 5 effectively taps the primary winding into two sections. The transformer T1 has a secondary winding S which is generally connected to a rectifying load and free-wheeling diode which load is not shown for purposes of simplicit. A first electronic switch Q1 connects the primary winding of the transformer, at terminal 5, to the source of rectified voltage appearing on the high voltage rail from the power supply source 50. Switch Q1 is an N-channel enhancement MOS device. The gate of switch Q1 is connected serially to the primary winding $P_1$ via a resistance R1 and a capacitance C1, with a resistor R2 connected in parallel across capacitor C1. The gate of Q1 is connected to terminal 5 of the primary of transformer T1 by a Zener diode ZR1, which diode in the preferred embodiment had an avalanche voltage of 6.8 volts. A resistor R3 is connected across the source and drain terminals of the switch Q1. A second electronic switch Q2 has its gate connected by means of a resistor R4 to the output of a pulse width modulation control and drive circuit 20. The gate of switch Q2 is also connected by means of a Zener diode ZR4 to the low voltage rail of the power supply source. The switch Q2 connects the terminal 4 of the primary winding to the lower rail when the gate voltage turns the switch Q2 on. A diode CR2 connects the lower rail to the primary transformer terminal 5. A diode CR3 connects the transformer terminal 4 to the upper rail.

In operation, at the start of each on period of the converter, the pulse width modulator control 20 turns Q2 on. At this instant, Q1's output capacitance $C_{OSS}$ is essentially discharged, placing nearly all of the supply voltage across the primary winding of transformer T1. The extra turns comprising the bootstrap winding appearing between terminals 5 and 6 of the primary are designed to develop approximately 12 to 14 volts at the low range of the supply voltage, while C1 is selected to be larger than the input capacitance $C_{1SS}$ of Q1. Consequently, the input capacitance $C_{1SS}$ is almost instantaneously charged to a voltage above Q1's threshold voltage, turning Q1 on. Zener diode ZR1 limits the gate voltage on Q1 to a safe value while the resistors R1 and R2 limit the amount of current that may flow through each Zener diode ZR1. The leakage inductance in transformer T1 will be adequate to delay the appearance of reflected loads in the primary until after switch Q1 has been turned on. When Q1 is turned on, the presence of the primary voltage keeps Q1 turned on until switch Q2 is switched off. At the end of the on time, as determined by the pulse width modulating control and drive circuitry 20, switch Q2 is turned off. At this time, stored energy in transformer T1 causes a voltage reversal at terminals 4, 5 and 6. Momentarily, this voltage is clamped at 1 or 2 volts while core reset current flows through diode CR3 and switch Q1. This interval ends as soon as Q1's voltage between the gate and source $V_{GS}$ drops below the turn-on threshold voltage $V_{TH}$. The stored charge on capacitor C1 contributes to fast reversal of the voltage $V_{GS}$. After Q1 turns off, the induced voltage across transformer T1 rises to the supply voltage.

Capacitors (not shown) associated with the supply voltage store the energy from transformer T1 received through the conduction of diodes CR2 and CR3. The reset period is approximately equal to the preceding on time of the converter. During reset time, the transformer T1 induced voltage causes a reversed current to flow through Zener diode ZR1 and the combination of capacitor C1 and resistor R2, thereby charging C1. At the end of core reset time, the transformer T1 induced voltage collapses to zero and the charge on capacitor C1 transfers to the gate source capacitance $C_{GS}$ to affect switch Q1 turn-on. This turn-on occurs during the converter off time while switch Q2 is held off. This turn-on time is important in that it discharges Q1's output capacitance $C_{OSS}$ and increases the effective value of $C_{OSS}$ as $V_{DS}$ reduces; $V_{DS}$ being the voltage across the drain and source of Q1. These two conditions contribute to the subsequent turn-on of Q1 at the next converter on time. The function of resistor R3 is to keep Q1 $C_{OSS}$ discharged after the charge on Q1 decays and allows Q1 to turn off.

In the preferred embodiment of the invention, switches Q1 and Q2 are IRF 730 devices. The primary section $P_2$ transformer $T_1$ has 60 turns and the bootstrap section $P_1$ has 4 turns. The nominal voltage from the power supply 50 appearing between the high and low rails is 336 volts D.C.

From the foregoing description, it can be readily seen that there is described a forward converter in which an additional winding on the power transformer is used to drive one switch of a two-switch converter, thereby eliminating the need of a second transformer. And while there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

We claim:

1. A two transistor forward converter comprising:
   a transformer having a primary and a secondary winding, said primary winding having a first end, a second end and a tap;
   first transistor means for connecting the tap of said primary winding to the high side of a power supply;
   second transistor means for connecting the first end of said primary winding to the low side of the power supply;
   first switch control means connected across the first end of said primary winding and said tap for activating said first transistor means; and
   second switch control means connectable to the low side of the power supply and said second switch for activating said second transistor.

2. The forward converter according to claim 1 and further comprising:
   a first diode means connecting the second end of said primary winding to the high side of the power supply; and
   a second diode means connecting the low side of the power supply to the tap of said primary winding.

3. The forward converter according to claim 1 wherein said first and said second transistor means are comprised of MOS devices having drain, source and gate electrodes and wherein said first switch control means is comprised of, a capacitor and a first resistor connected in series between said gate electrode and the first end of said primary winding, a second resistor connected across said capacitor, and a Zener diode connected between the tap on said primary winding and the gate electrode of said first transistor means.

4. The forward converter according to claim 3 and further comprising a second Zener diode connected to the gate electrode of said second transistor means and the low side of the power supply.

5. A two transistor forward converter comprising:
   a transformer having a primary and a secondary winding, said primary winding being tapped to form a first primary section and a second primary section, said second primary section having a number of winding turns substantially greater than the number of winding turns of said first primary section;
   a power supply having a high and a low side;
   a first switch for periodically connecting the tap of said primary winding to the high side of said power supply;
   a second switch responsive to a control signal for periodically conducting and connecting one end of the second primary secfion to the low side of said power supply;
   control means for providing the periodic control signal to said second switch means;
   first control means connected across said first primary section for periodically activating said first switch means in response to the potential developed across said first primary section; and
   rectifying means across said second primary section and said power supply to limit the potential across said second primary sections when said switches are not conducting.

6. The forward converter according to claim 5 and further comprising:
   a first Zener diode connected between the tap of said primary winding and said first switch; and
   a second Zener diode connected between the low side of said power supply and said second switch.

7. The forward converter according to claim 5 wherein said first control means is comprised of:
   a capacitor;
   a resistor connected in series with said capacitor across said first switch means and the non-tapped side of said first primary section; and
   a second resistor connected across said capacitor.

* * * * *